United States Patent [19]
Lawton et al.

[11] Patent Number: 5,158,858
[45] Date of Patent: Oct. 27, 1992

[54] SOLID IMAGING SYSTEM USING DIFFERENTIAL TENSION ELASTOMERIC FILM

[75] Inventors: John A. Lawton, Landenberg, Pa.; Daniel J. Mickish, Wilmington, Del.

[73] Assignee: E. I. du Pont de Nemours and Company, Wilmington, Del.

[21] Appl. No.: 562,911

[22] Filed: Jul. 5, 1990

[51] Int. Cl.$^5$ .................. G03C 1/492; G06F 15/20
[52] U.S. Cl. .................. 430/269; 430/394; 264/22; 264/40.1; 425/174.4
[58] Field of Search ......... 430/269, 394; 264/22, 264/40.1; 425/174.4; 427/54.1

[56] References Cited

U.S. PATENT DOCUMENTS

| | | |
|---|---|---|
| 2,775,758 | 12/1956 | Munz .................. 343/17 |
| 4,575,330 | 3/1986 | Hull .................. 425/174.4 |
| 4,752,498 | 6/1988 | Fudim .................. 427/54.1 |

FOREIGN PATENT DOCUMENTS 0250121 12/1987 European Pat. Off. .

OTHER PUBLICATIONS

Automatic method for fabricating a three-dimensional plastic model with photo-hardening polymer, Hideo Kodama, Rev. Sci. Instrum. 52(11), Nov. 1981, pp. 1770–1773.
A Review of 3D Solid Object Generation, A. J. Herbert, 1989, SPSE-The Society for Imaging Science and Technology, pp. 186–190.
Solid Object Generation, Alan J. Herbert, 1982, Society of Photographic Scientists and Engineers, pp. 185–188.

*Primary Examiner*—Cynthia Hamilton
*Attorney, Agent, or Firm*—Thomas H. Magee

[57] ABSTRACT

An apparatus and method for fabricating integral three-dimensional objects from successive layers of deformable and photoformable compositions by exposing the layers of the composition through a tensioned, elastomeric transparent film, in a way that the weak bonds between the film and each newly solidified layer are broken by changing the tension on the film, thus allowing a new layer of deformable composition to be introduced between the film and the solidified layer.

15 Claims, 2 Drawing Sheets

SOLID IMAGING SYSTEM USING DIFFERENTIAL TENSION ELASTOMERIC FILM

BACKGROUND OF THE INVENTION

1. Field of the invention

This invention relates to production of three-dimensional objects by photoforming, and more particularly to the controlled application of thin flat layers of a photoformable composition accurately and quickly to a platform or previously photoformed layer(s) to accomplish said production with layers of improved flatness, accuracy and integrity.

2. Description of Related Art

Many systems for production of three-dimensional modeling by photoforming have been proposed European Patent Application No. 250,121 filed by Scitex Corporation Ltd., on Jun. 6, 1987, which discloses a three-dimensional modeling apparatus using a solidifiable liquid, and provides a good summary of documents ertinent to this art. U.S. Pat. No. 4,757,330 (C. W. Hull), issued on Mar. 11, 1986, describes a system for generating three-dimensional objects by creating a cross-sectional pattern of the object to be formed at a selected surface of a fluid medium capable of altering its physical state in response to appropriate synergistic stimulation by impinging radiation, particle bombardment or chemical reaction, successive adjacent laminae, representing corresponding successive adjacent cross-sections of the object, being automatically formed and integrated together to provide a step-wise laminar buildup of the desired object, whereby a three-dimensional object is formed and drawn from a substantially planar surface of the fluid medium during the forming process. U.S. Pat. No. 4,752,498 (E. V. Fudim), issued on Jun. 21, 1988, describes an improved method of forming three-dimensional objects, which comprises irradiating an uncured photopolymer by transmitting an effective amount of photopolymer solidifying radiation through a radiation transmitting material which is in contact with the uncured liquid photopolymer. The transmitting material is a material which leaves the irradiated surface capable of further crosslinking so that when a subsequent layer is formed it will adhere thereto. Using this method, multilayer objects can be made.

Publication "Automatic Method for fabricating a three-dimensional plastic model with photohardening polymer" by Hideo Kodama, Rev. Sci. Instrum. 52(11), 1770-1773, November 1981, describes a method for automatic fabrication of a three-dimensional plastic model. The solid model is fabricated by exposing liquid photo-forming polymer to ultraviolet rays, and stacking the cross-sectional solidified layers. Publication "Solid Object Generation" by Alan J. Herbert, Journal of Applied Photographic Engineering, 8(4), 185-188, August 1982, describes an apparatus which can produce a replica of a solid or three-dimensional object much as a photocopier is capable of performing the same task for a two-dimensional object. The apparatus is capable of generating, in photopolymer, simple three-dimensional objects from information stored in computer memory. A good review of the different methods is also given by a more recent publication, titled "A Review of 3D Solid Object Generation" by A. J. Herbert, Journal of Imaging Technology 15: 186 ∝ 190 (1989).

Most of these approaches relate to the formation of solid sectors of three-dimensional objects in steps by sequential irradiation of areas or volumes sought to be solidified. Various masking techniques are described as well as the use of direct laser writing, i.e., exposing a photoformable composition with a laser beam according to a desired pattern and building a three-dimensional model layer by layer. In addition to various exposure techniques, several methods of creating thin liquid layers are described which allow both coating a platform initially and coating successive layers previously exposed and solidified.

Current methods of coating suggested thus far, however, have drawbacks in that they are not capable of ensuring flat uniform layer thickness or of producing such layers quickly, or they do not effectively prevent damage or distortion to previously formed layers during the successive coating process and they involve coating only liquid formulations of preferably low viscosity. Furthermore, they omit to recognize very important parameters involved in the coating process such as the effects of having both solid and liquid regions present during the formation of the thin liquid layers, the effects of fluid flow and rheological characteristics of the liquid, the tendency for thin photoformed layers to easily become distorted by fluid flow during coating, and the effects of weak forces such as hydrogen bonds and substantially stronger forces such as mechanical bonds and vacuum or pressure differential forces on those thin layers and on the part being formed.

The Hull patent, for example describes a dipping process where a platform is lowered either one layer thickness or is dipped below the distance of one layer in a vat then brought up to within one layer thickness of the surface of the photoformable liquid. Hull further suggests that low viscosity liquids are preferable, but for other practical reasons, the photoformable liquids are generally high viscosity liquids. Although theoretically most liquids will flatten out eventually, high viscosity liquids and even low viscosity liquids take an inordinate amount of time to flatten to an acceptable degree especially if large flat areas are being imaged and if the liquid layer thickness is very thin. Regions where previous layers consist of solid walls surrounding liquid pools further compounds the flattening process of the thin liquid layer coating. In addition, motion of the platform and parts, which have cantilevered or beam (regions unsupported in the Z direction by previous layer sections), within the liquid creates deflections in the layers, contributing to a lack of tolerance in the finished part.

The Munz patent (U.S. Pat. No. 2,775,758, issued in 1956) and Scitex application describe methods by which the photoformable liquid is introduced into the vat by means of a pump or similar apparatus such that the new liquid level surface forms in one layer thickness over the previously exposed layers. Such methods have all the problems of the Hull methods except that the deflections of the layers during coating is reduced.

The Fudim patent describes the use of a transmitting material, usually rigid and coated or inherently unlikely to adhere to the solidified photopolymer, to fix the surface of the photopolymer liquid to a desired shape, assumably flat, through which photopolymers of desired thickness are solidified. The methods described by Fudim do not address the problems inherent in separating such a transmitting material from a photopolymer formed in intimate contact with the surface of the transmitting material. Whereas the effects of chemical bonding may be reduced significantly by suitable coatings or inherently suitable films, the mechanical bonds along with hydrogen bonds, vacuum forces, and the like are still present and in some cases substantial enough to cause damage or distortion to the photopolymer during removal from the transmitting material surface. Furthermore, evaluations made by the Applicants indicate that the forces, resisting the separation or even sliding off the solidified layer having been exposed in intimate contact with the suitably non-adhesive transmitting material, are capable of damaging the solidified layer, especially when surrounded by photoformable liquid and even more especially when the solidified layers are thin. No method is described in the Fudim patent to eliminate these problems.

The instant invention removes these vexing problems by utilizing a stretched elastomeric film in contact with the photoformable composition, imaging through said elastomeric film, changing adequately the tension on the film to break the weak bonds between the solidified layer and the film, forming a new layer, and repeating the steps until the desired three-dimensional object is ready. Thus, the present invention provides a method and apparatus for quickly producing layers of a deformable and photoformable composition, which are flat, and with which previously exposed and solidified layers have improved flatness, accuracy and integrity during the process. Preferably, the solidified layers according to this invention have a thickness of less than 0.030".

Deformable compositions are those, which under pressure alone, or under both pressure and temperature take the form of the mold they are in, or the shape of the surfaces they are pressed by. The layer is considered to be solidified when hardened, or polymerized, or cross-linked by the radiation, or even more generally when its viscosity is increased by the radiation, so that higher pressure and/or temperature will be needed for it to be re-deformed, if at all possible. Liquids are the preferred deformable compositions, as they deform by the pressure of their own weight, thus being free flowing.

SUMMARY OF THE INVENTION

The instant invention is directed to a method and apparatus for direct production of three-dimensional objects layer by layer using exposure means for each layer, wherein the coating of each layer is controlled to be thin, flat, quickly applied and non-detrimental to previously applied and exposed layers. The present invention involves stretching an elastomeric film, which is in contact with a photoformable composition, imaging through said elastomeric film, changing adequately the tension on the film to break the weak bonds between the solidified layer and the film, forming a new layer, and repeating the steps until the desired three-dimensional object is ready. More particularly, this invention pertains to a method for fabricating an integral three-dimensional object by imagewise exposing successive layers of a deformable and photoformable composition to actinic radiation, said method including placing the composition in a vessel containing a platform, comprising the steps of positioning a transparent elastomeric non-adhering film within the composition at a distance equal to the thickness of one layer from the platform, subjecting the elastomeric film to a first tension, exposing imagewise the photoformable composition contained between the film and the platform to radiation through the transparent elastomeric film in order to form a solidified layer, subjecting the elastomeric film to a second tension, the difference between the first and the second tensions being adequately high to overcome the low adherence between the film and the solidified layer, increasing the distance between the platform and the film by the thickness of a layer, causing the deformable composition to flow over the solidified layer, and repeating the same steps until the integral three-dimensional object is formed.

Preferably, the method further comprises the step of securing on top of and in contact with the film, a substantially flat, substantially rigid and substantially transparent plate.

This invention also pertains to an apparatus for fabricating an integral three-dimensional object from successive solidified layers of a deformable and photoformable composition, comprising an assembly of imaging means, and a coating station having a vessel for containing the composition and a substantially flat platform disposed within the vessel. The coating station also comprises a transparent, elastomeric and non-adherent film supported over the platform at a distance equal to the thickness of a layer, tensioning means for controllably applying tension to the film, and placement means for controllably varying the distance between the film and the platform in order to allow the successive layers of the photoformable composition to be formed under said film and be solidified by imagewise exposure to radiation provided by the imaging means.

Preferably, the apparatus further comprises a substantially flat, substantially rigid and substantially transparent plate secured on top of and in contact with the film.

DETAILED DESCRIPTION OF THE PREFERRED EMBODIMENTS

This invention relates to a method and apparatus for producing three-dimensional objects by solidifying successive layers of deformable and photoformable composition, preferably liquid photoformable compositions, and more particularly to controlled ways of providing flat thin photoformable composition layers quickly, ways of avoiding distortion and damage of the layers of the photoformed and solidified composition which has been exposed, and ways of applying these successive layers of deformable composition, which ways prevent the introduction of gas bubbles and reduce distortion to previously exposed and solidified layers, and are produced with improved flatness, accuracy and integrity.

Figure 1:
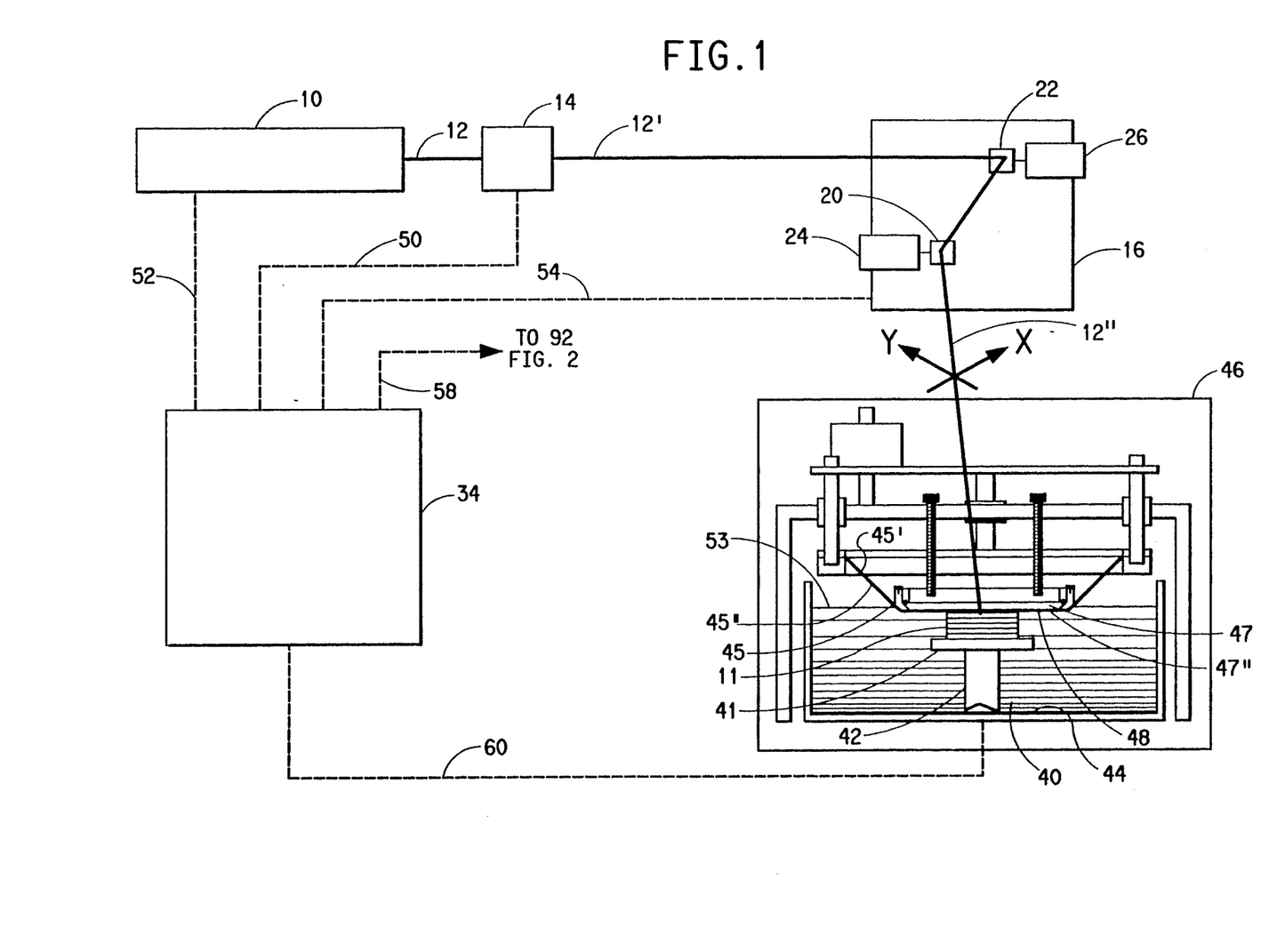
FIG. 1 is a schematic diagram showing the apparatus utilized in the practice of the preferred embodiment of the instant invention.

The preferred embodiment of this invention is illustrated in FIG. 1. There is provided an imaging station or means including a radiation source 10, a modulator 14, a computer 34 and a scanner 16. There is also provided a coating station 46. Radiation means 10, is preferably a laser, producing a radiation beam 12. Being desirable to produce solid objects at high speed, the apparatus of the instant invention preferably utilizes relatively high power radiation means 10, such as high power lasers, which may have major bands in the visible, infrared, or ultraviolet regions. High power is considered to be a power greater than 20 mW, and preferably over 100 mW as measured from the intensity of radiation beam 12. This is so with the present photospeeds of photoformable compositions. However, as faster compositions become available, the values of 20 mW and 100 mW for the beam intensity will become lower accordingly, since photospeed of the composition and intensity of the radiation beam have an inverse relation to each other in order to achieve the same results. The selection of a certain type of laser should be coordinated with the selection of the photoformable composition in a way that the sensitivity of the photoformable composition agrees reasonably well with the wavelength of the laser's emission. Other types of radiation means may also be utilized such as electron beams, x-rays, and the like, as long as their energy type is matched with the sensitivity of the photoformable composition, a beam is provided, and the appropriate conditions for their handling are observed according to established ways, well known in the art. Although means may be provided to modify the shape of the beam cross-section to any desirable shape, the ordinary shape is circular, and the profile of the intensity of the beam is gaussian with a maximum at the center of the circular shape.

The radiation beam 12 passes through modulator 14, the modulator being preferably an acousto-optical modulator. The modulated radiation beam 12' passes in turn through deflection means 16, which comprises two mirrors 20 and 22, each mirror having an axis (not shown), allowing reflection of the beam to surface 53 in X and Y directions, the X and Y directions being perpendicular to each other and parallel to surface 53. The mirrors 20 and 22 may rotatably move around their corresponding axes by means of motors 24 and 26, respectively for controllably deflecting the beam in a vector scanning mode, in the X and Y directions towards predetermined positions of a photoformable composition 40, contained in vessel 44 of the coating station 46. Examples of suitable photoformable compositions are given at a later section of this description. As the beam is deflected by the deflection means 16, it assumes an acceleration from zero level to a maximum acceleration and a velocity from zero level to a maximum constant velocity. The velocity and the intensity of the beam remain proportional to each other, so that the exposure remains substantially constant. The beam exposes imagewise preselected portions of the composition to a substantially constant depth as described below.

For the purposes of this invention, however, the radiation beam 12" may be not only a focused beam from a laser, but also other light source or light, modified in a number of different ways. For example, it may be transmitted through any type of variable optical density photomask such as a liquid crystal display, silver halide film, electro-deposited mask etc., or reflected off of any variable optical density device, such as a reflective liquid crystal cell.

Figure 2:
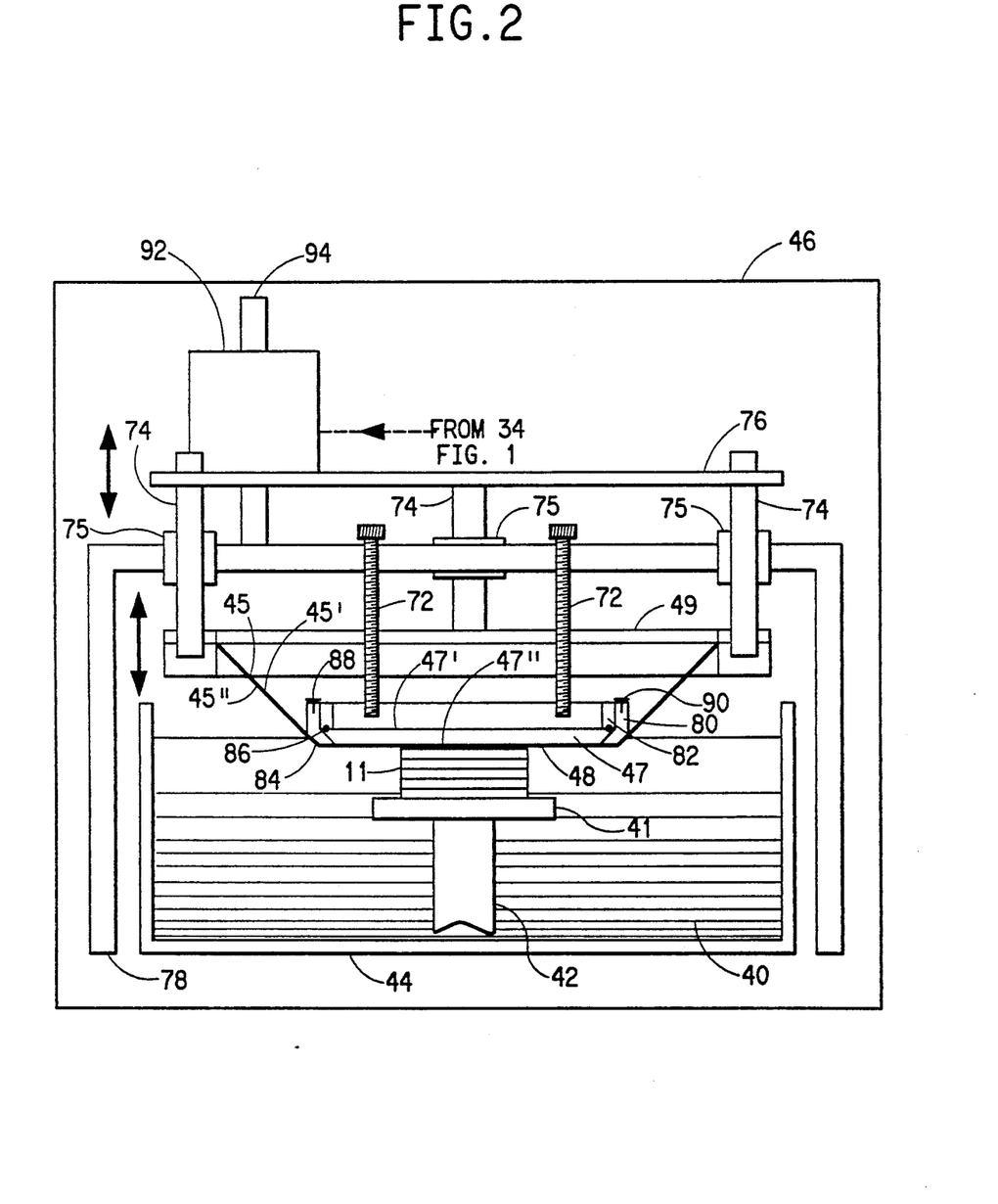
FIG. 2 illustrates in a schematic form and higher detail the components of the coating station of the embodiment illustrated in FIG. 1.

FIG. 2, depicts in more detail the coating station 46 of the preferred embodiment of this invention. There is provided a vessel 44 for containing the photoformable composition 40. There is also provided a substantially flat platform 41 disposed within the vessel 44 and within the composition 40. Above vessel 44, there is tension means in the form of a tension frame 49, connected to both the stretchable elastomeric film 45 and to the sliding shafts 74. Film 45 may be tensioned and stretched by tension frame 49 to different degrees as the frame is forced to slide up and down by the sliding shafts 74. Film 45 is elastomerically stretched around a substantially flat, substantially rigid and substantially transparent plate, such as glass plate 47, which is secured in place by external frame 80, and internal frame 82. By "elastomerically stretched" is meant that the nature of the film is such that when it is subjected to a certain degree of tension it elongates considerably, and when the tension is decreased or removed the film attains accordingly smaller or the initial dimensions, respectively. Film 45 should be transparent, flexible and non-adherent to composition 40, at least after solidification of the composition by exposure to actinic radiation, and preferably even before irradiation. By "non-adherent" is meant that the film develops only very low or minimal adherence to the solidified photoformable composition, and that it may be removed under the requirements of the present invention without destructive effects on the solidified layers of the composition after photoimaging.

The external frame 80 and the rigid plate 47 help in guiding film 45 over the platform in a way to maintain a position substantially parallel to the platform. The internal frame 82 and the external frame 80 are secured on each other by overlap flange 88 and securing screws 90. The sealing O-ring 86 at the bottom of the internal frame 82, and the beveled edge 84 of the external frame 80, support the plate 47 in place.

The film 45 has a first surface 45' and a second surface 45", the two surfaces being on the opposite sides of the film, and parallel to each other. Film 45, being intended to be operable within the composition 40, is dipped in composition 40 in a way that the first surface 45' is away from the composition, and prevented to be wetted by the composition 40. On the other hand, the second surface 45" is at least partially in contact with the composition 40.

Plate 47, being substantially flat, substantially rigid and substantially transparent to actinic radiation, has an upper planar surface 47', and a lower planar surface 47", the two surfaces being on the opposite sides of plate 47, and substantially parallel to each other. Plate 47 is secured on top of film 45 as described hereinabove, in a way that the lower surface 47" of plate 47 is in contact with the first surface 45' of elastomerically stretched film 45. The term "on top" is used to define the relative position of the plate 47 with respect to the film 45 and the composition 40; not the relative position of these components to the earth. Thus, even in a situation, where the configuration of these components would be turned with respect to the earth, the term "on top" would describe the same relative position.

The total system is supported by supporting frame 78, which frame 78 surrounds vessel 44. On the top portion of supporting frame 78, there are provided bushings 75 which are used to guide sliding shafts 74. Sliding shafts 74 support at their lower end the tension frame 49, while at the upper end they are connected to a drive frame 76. Drive frame 76 is rigidly connected to stepper motor 92. Stepper motor 92 has a threaded drive shaft 94 so when the motor is energized it causes shaft 94 to move up an down. This movement forces drive frame 76 to also move up and down, thus transferring the movement to sliding shafts 74 which then in turn move tension frame 49 up and down, thus subjecting film 45 to different tensions and elongations.

There is also provided placement means 42, for controllably varying the distance between the platform 41 and the second surface 45" of film 45 in order to allow the successive layers 11 of the photoformable composition 40 to be formed under second surface 45" of film 45 and be solidified by the imagewise exposure to radiation provided by the imaging means. The layer 48 of composition 40, included between the second surface 45" of film 45 and either the previously solidified layers 11 or the platform 41 in the absence of other solidified layers, is initially deformable and preferably a liquid before exposure, but it solidifies after the exposure to actinic radiation. It is preferable that placement means 42 is controlled by computer 34, and that the platform 41 is moved in a direction normal to the lower planar surface of transparent plate 47.

As shown in FIG. 1, communication lines 52, 50, 54, and 60 are also provided for computer 34 to control the radiation source 10, the modulator 14, the deflection means 16, and the placement means 42, respectively. Line 58 is used between computer 34 and stepper motor 92 for providing control to motor 92 by computer 34.

The elastomeric transparent film 45 may be any material; which is substantially transparent to radiation beam 12" and of sufficient optical quality to prevent scattering of beam 12"; which is of substantially uniform thickness; which is elastomeric enough to withstand repetitive cycles of increased and decreased tension and elongation; which is not permeable to the photoformable composition 40; which is smooth; and which is substantially non adhering to the deformable layer 48 of the photoformable composition 40 or to the solidified part 11 of composition 40.

Preferred elastomeric films are transparent silicone elastomers and fluoroelastomers, such as for example clear Kalrez TM, sold by DuPont. Most preferable are fluoroelastomers such as the ones described in EPO Publication No. 0444700 dated Sep. 4, 1991, which is herein incorporated by reference. A film of this type, which was extensively used during this work, was prepared as follows:

(A) A 10 gallon stainless steel autoclave was evacuated and purged with nitrogen and then was charged with 2600 liters of deionized, deoxygenated water containing 1.5 liters of Freon 113 (1,1,2 trichloro, 1,2,2 trifluoro ethane), and in which was dissolved 56 g. of ammonium perfluorooctanoate surfactant (FC-143, 3M Co.). The reactor was then pressured to about 0.2 MPa (30 psi) with the "start-up monomer" mixture which had the following composition: 30% by weight TFE (tetrafluoroethylene) and 70% by weight PMVE [perfluoro (methyl vinyl ether)]. The autoclave was vented off to about 0.03 MPa (5 psi). The pressuring and venting was repeated 2 more times. At this time, 3.6 g of 1,4 diiodoperfluorobutane, dissolved in 36 ml of 1,1,2 trichloro 1,2,2 trifluoroethane, was added, and the autoclave was heated to 80° C. while stirring at 125 RPM. The autoclave was then pressured to 2.1 MPa (300 psi) with the "start-up monomer" mixture described above. To start the polymerization, the autoclave was charged with 20 ml of a 2% solution of ammonium persulfate in H20. After the pressure in the autoclave had decreased to about 2.0 MPa (295 psi).

The autoclave was maintained at a pressure of about 2.1 MPa (300 psi), during the course of the polymerization, by regular addition of the "make-up monomer" mixture. The "make-up monomer" mixture had the following composition: 46% by weight TFE, 8% by weight ethylene, and 46% by weight PMVE. The polymerization was allowed to continue for a total of 15 hours during which time 6500 grams of the make-up monomer mixture was added. Also, during this period an additional 129 ml of 1% ammonium persulfate was added in small increments. The unreacted monomers were vented from the autoclave and the polymer dispersion was discharged into a large container. The pH of the dispersion was 2.7 and it contained 20.7% solids.

The fluoroelastomer was isolated from 500 ml of the above dispersion by coagulating with potassium aluminum sulfate solution. The coagulated polymer was separated from the supernate by filtration and then washed 3 times by high speed stirring in a large blender. Finally, the wet crumb was dried in a vacuum oven at 70° C. for 40 hours. The recovered, dry polymer from the 500 ml aliquot weighed 114 grams. The composition of the fluoroelastomer was as follows: 45% by weight TFE, 6.8% by weight ethylene, and 38.2% by weight PMVE. The polymer contained 0.22% iodine and had a Mooney viscosity, ML-10, measured at 121C, of 32.

(B) A 10 gallon autoclave was charged with 30 Kg of the polymer dispersion prepared in (A) above. The autoclave was then evacuated and purged 3 times with N2, then 3 times with a new "start-up" monomer mixture of the following composition: 90% by weight TFE and 10% by weight ethylene. The autoclave was then heated to 80C and pressured to 1.3 MPa (190 psi) with the new "start-up monomer" mixture. The polymerization was then initiated by addition of 20 ml of 1% ammonium persulfate solution. The pressure was kept constant by addition of a new "make-up monomer" mixture which had a composition of 80% by weight TFE and 20% by weight ethylene. A total of 1050 g of the new "make-up monomer" mixture was added in a 4.3 hour reaction time. The monomers were then vented off and the segmented polymer dispersion was discharged from the reactor. The dispersion contained 26.8% solids. The segmented polymer was isolated from the dispersion in the same manner as described for the fluoroelastomer in (A) above. A total of 8.3 Kg of polymer was recovered.

Differential Scanning Calorimetry testing on the segmented polymer indicated a glass transition temperature of −14° C. for the fluoroelastomer segment and a melting point of 233° C. for the thermoplastic segments. The iodine content of the polymer was 0.13%. The melt index (ASTM D-2116 using a 5 kg weight at 275C) was 3.0 g/10 min.

A compression molded film of the polymer had M100 (modulus at 100% elongation) of 3.4 MPa (500 psi), tensile strength (break) of 23.4 MPa (3400 psi) and elongation (break) of 380%.

The fluffy polymer recovered according to the above procedure was extruded into beads (approx. 3mm×6 mm) in a 28 mm twin screw extruder at 250C under nitrogen. The same type of extruder was then used at 300C under nitrogen to extrude a film through a slit die on a casting drum. The film thickness was 0.0115".

The transparent plate 47 may be any material which is of substantially uniform thickness and flatness, with adequate rigidity to maintain desired flatness while exposures by radiation beam 12" are being accomplished and is of sufficient transmittance and optical clarity to allow said radiation beam 12" to transmit through said transparent plate 47 for efficient photohardening or solidification of photoformable composition 48 one layer's thickness below said transparent flexible film 45. Examples of suitable materials for use as a transparent plate 47 are flat glass or silica plates as well as plastic ones such as transparent acrylic or polycarbonate plates. The only critical requirement is that they are transparent and substantially flat.

It has been discovered by the Applicants that photoformable compositions, exposed by radiation means while in intimate contact with a relatively rigid surface, form substantially strong bonds, that cannot be easily overcome by direct pulling of the two surfaces apart or by sliding one surface relative to each other, even though that surface is coated with a suitable anti-stick material. Polytetrafluoroethylene, PFA, polypropylene, and polyethylene films, which have little or no chemical interaction with the photoformable or photohardened (solidified) composition, and therefore, which should have no adherence to such materials, could not be directly pulled from the surface of the hardened or solidified composition or slid off said surface after exposure in a similar arrangement as shown in FIGS. 1 and 2, with the difference that the rigid plate was absent. However, the Applicants discovered that by following the steps of the present invention, the film detaches from the surface with little effort.

It should be noted at this point that the meaning of the words photohardening, hardening and solidifying in this text denotes transformation of a deformable material to a solid by radiation means. These three words are used interchangeably. Also, as long as a material does not flow under its own weight, it is considered to be a non-liquid.

The photoformable compositions which can be used in the practice of the instant invention are any compositions which undergo solidification under exposure. Such compositions comprise usually but not necessarily a photosensitive material and a photoinitiator. The word "photo" is used here to denote not only light, but also any other type of actinic radiation which may transform a deformable composition, and preferably a liquid one to a solidified one by exposure to radiation. Cationic or anionic polymerizations, as well as condensation and free radical polymerizations and combinations thereof are examples of such behavior. Cationic polymerizations are preferable, and free radical polymerizations even more preferable. Photoformable compositions containing thermally coalescible materials are of even higher preference.

In operation of the preferred embodiment of this invention, the radiation means 10 shown in FIG. 1, provides a radiation beam 12 having an intensity as aforementioned. The radiation beam 12 passes through a modulator 14, where its intensity may be modulated from zero intensity level to a maximum beam intensity having a value less than that of the unmodulated beam intensity, due to energy losses. The modulated radiation beam 12', having somewhat decreased intensity due to losses, passes in turn through deflection means 16 having a two-mirror 20 and 22 assembly, each mirror separately driven by a different motor 24 and 26 respectively. Mirror 20, driven by motor 24 deflects the beam in a X direction, while mirror 22 deflects the beam in a Y direction, X direction being perpendicular to the Y direction. Electrical feedback regarding the relative movements of the mirrors 20 and 22 is provided by the deflection means to computer means 34 through line 54. This feedback, being correlatable to the velocity and average residence time of the beam on the predetermined portions of the thin layer 48, is processed by computer means 34, and it is fed to the modulation means 14 as a control command through line 50 in order to modulate the intensity of the radiation beam, so that the product of the intensity of the beam and the average residence time at each position of the predetermined portions of layer 48 remains substantially constant. Thus, the exposure level, being by definition the product of these two parameters, remains substantially constant. By maintaining the exposure level constant over the predetermined portions of each successive thin layer, the thickness of the layers is also kept substantially constant. This correction or compensation is very important, especially at unsupported portions of the thin layers, where swollen edges will appear as a result of overexposure due to the low initial velocity at the edges in vector scanning. The higher the intensity of the beam 12" or the higher the photosensitivity of the photoformable composition the more severe this problem becomes in the absence of means to maintain the exposure level constant. Also, the greater the sensitivity of the composition 40, the more severe the problem becomes without some means of exposure control. Such exposure control is also necessary in raster scanning or in systems incorporating overscanned vector schemes, the difference being that the edges of the image may be underexposed due to lack of exposure contribution from adjacent non-exposed regions. In these cases, modulation means are utilized to ensure that the image edges receive substantially the same exposure as non-edge image regions.

In any event, radiation beam 12", is controllably directed towards photoformable composition 40, which is contained in vessel 44.

Initially, external frame 80 is at such position as to guide film 45 to be parallel and at a predetermined distance from platform 41, corresponding to the desired thickness of a layer, and allowing photoformable composition 40 to be present as a layer 48 between the platform 41 and the second surface 45" of flexible film 45. The layer 48 is then imagewise exposed by the actinic radiation of beam 12".

At this point, tension frame 49 has been set at such position, that causes elastomeric film 45 to assume a first low tension. Upon completion of the imagewise solidification of layer 48, stepper motor 92 is energized by computer 34, and in turn causes drive shaft 94 to raise drive frame 76, which through sliding shafts 74 raises the tension frame 49. This action has as a result to elongate, stretch and tension film 45 to a second tension, so that the bonds between the solidified layer 48 and the second surface 45 are broken. Then, going through the opposite operation, tension frame 49 is lowered to the initial position, and elastomeric film 45 resumes its initial status.

Instead of having the film at a low first tension and then subject it to a higher second tension and elongation, in order to break the bonds, one can operate exactly the opposite way. According to the second procedure, the film is tensioned to a rather high first tension before and during the imaging step. After the imagewise exposure has been completed, the film is relieved from the high first tension by subjecting it to a lower second tension, so that the bonds are broken again in a similar manner. It becomes evident then that repeated increases and decreases in tension may also be utilized in the practice of this invention. An added benefit attained during the step of decreasing the tension is the fact that photohardenable composition is pulled along the second surface 45".

For the purposes of the present invention, an ultimately important parameter is elongation, and especially local elongation at the areas where the adhesion has to be destroyed. It is preferable that a film elongation difference of over 50%, and more preferably over 100% between the first and second tensions exists, as long as the film is not ruined.

Although plate 47 is not necessarily required for practicing the present invention, it is desirable to have it present for the film to assume as flat as possible a configuration.

A lubricant between surfaces 47" and 45' may be used to allow free sliding of the film over and around the plate 47 and the external frame 80. Optical matching between the lower planner surface 47" and the first surface 45' of film 45 as well as composition 40 is desirable. Thus, in addition to the lubricant which is desired between the surfaces of the film and the frame or the film and the plate, it is even more desirable to use a fluid which may play the role of optically matching as well as lubricating said surfaces. Although most transparent fluids are capable of lubricating and giving a better optical matching than the air-film and air-plate interfaces, silicone oils are the preferred liquids. One example is Laser Liquid TM No 5610 made by R. P. Cargille Laboratories, Inc., Cedar Grove, N.J. 07009.

One can apply radial tension if both the tension frame 49 and the external as well as the internal frames 80 and 82 have a round shape. By raising tension frame 49, a radial tension will be applied on the elastomeric film 45, if all its edges are supported by the tension frame 49. In contrast, a linear tension will be applied, if frame 49 as well as frames 80 and 82 are rectangular and only two opposite sides of film 45 are supported on respective sides of tension frame 49, while the other two sides of the film are only loosely held.

Radial tension is producing more uniform distribution of forces. However, sometimes it is preferable to have a linear tension. To avoid high stresses on the produced solidified layers, it is often desirable to direct the tension in a substantially parallel direction to the direction of scanning. By using this mode, better results are obtained many times, since the stresses are applied parallel to the direction of the higher strength of the configuration. This is even more important when cantilevered layers to be solidified are present.

In case the deformable material is not a free flowing liquid, the system may be pressurized to promote easier flow toward easier formation of layer 48.

In the active area of the film, where photoimaging takes place, the tension is applied in a direction substantially parallel to the first and second surfaces of the film. It is important that the radiation is high enough to cause reasonable adherence between the solidified layer and the platform, but only low adherence between the film and the solidified layer.

Breaking of the bonds between the film and the solidified layer overcomes the low adherence between those two components upon adequate differences of the first and the second tensions. As aforementioned, the absolute value of these differences is of essence, and not whether the first tension is smaller or greater than the second tension.

At this point, placement means 42 moves platform 41 in a direction perpendicular to the planes defined by the surfaces 45' and 45" of the film 45, in order to increase the distance between the platform and the film 45 by the thickness of a layer. Although it is preferable to move directly the platform 41 by the thickness of one layer, a movement of an excess thickness ending to the thickness of just one layer may also be employed. Placement means 42 may move platform 41 also during the film stretching steps, and preferably during the step of decreasing the tension to facilitate the flow of composition between the second surface 47" and the previously solidified layers. In the case that the value of the tension applied during imaging has to be changed for any reason, the difference of film thickness at the different tension has to be taken into account so that the platform is lowered accordingly in order to maintain uniform layer thickness.

The same cycle is repeated until the three dimensional object has been completed. If the photoformable composition comprises plastisol or other thermally coalescible material further thermal treatment as aforementioned is in most cases required. In cases where no thermally coalescible materials are present the post treatment in many cases does not offer any drastic advantages.

The deflection of the two mirrors 20 and 22 connected to motors 24 and 26, and the modulation means 14 are controlled by computer means 34 through control/feedback lines 54 and 50, respectively. The graphic data corresponding to the shape of the solid object under production are also stored in computer means 34. The graphic data stored in computer means 34, after being processed cause motors 24 and 26 to turn and move mirrors 20 and 22 accordingly in order to deflect the radiation beam towards predetermined positions on the thin layer 48. It is preferable that computer 34 also controls and commands the rest of the components through appropriate data fed into the computer so that these components perform timely and accurately their functions by methods well known in the art.

Although this method of coating is not limited relative to layer thickness, it is preferable that layers of 30 mils or less be produced.

The Applicants propose the following mechanisms as a possible explanation to the results obtained according to the instant invention. However, this proposal is merely a suggestion, and it must be taken only as such by the reader. By no means, Applicants' proposal should be construed as limiting in any way the breadth and scope of this invention.

It seems that stretching and elongating the film, as compared to attempting to slide a non-elastomeric film, transforms the removal forces from a sum of adhesion forces distributed over the total area of the film to a sum of adhesion forces distributed along a front at the border line between the adhered and non-adhered portions. Such a change in removal force distribution area vastly reduces the total effort of removal of the film.

The advantages of the Applicants' invention can be more greatly appreciated when it is also considered that the layers of the photohardened or solidified composition are thin and sometimes unsupported other than as cantilevered or beam sections. These thin layers cannot withstand much load, since they have a stiffness that decreases roughly as a function of the unsupported length of the overhang cubed. The process involved in elastomerically stretching the film and breaking the bonds between the surface 45" of the film and the solidified layer is considerably less stressful on the layers than plain removal of the film, or a relatively rigid plate for that matter, by using other means.

Submergence of the film under the substantially rigid transparent plate also ensures that hydraulic pressure holds or at least helps in holding the film flat against the bottom of the plate. To ensure good optical coupling between the substantially rigid transparent plate, the film and the photoformable composition it is preferable that the materials be refractive index matched as closely as possible and/or a coupling fluid, preferably of similar refractive index be used between the film and the plate to fill in any gaseous voids or voids of other type that may occur at their interface. To ensure uninterrupted stretching and elongation throughout the active area for the film, the presence of a transparent lubricant is desirable between the film and the plate and/or between the film and the external frame. The coupling fluid may also act as the lubricant during the process. Examples of such coupling fluids are Laser Liquids ™ manufactured by R. P. Cargille Laboratories of Cedar Grove, N.J. It is also preferable that the air contacting side of the substantially rigid transparent plate be coated with the proper dielectric optical coating for optimum radiation beam coupling into said transparent plate.

With this process of coating or application of layers, excess movements of the movable platform are avoided. It is necessary to move the platform away from the tensioned film 45 only by the thickness of one layer for each imaging step. This increases considerably the speed of production, and in addition it is less damaging or distorting to the layers being made, since the movement is small and the hydraulic forces of fluid flow are largely absorbed by the lower surface of the platform, in contrast to other methods based on plunging the platform to a considerable distance away from the surface of the liquid and then retracting to attain the desired thickness of the liquid layer. It becomes also clear that the distance between the platform 41 and the elastomerically stretched film 45 during every imaging step determines the depth or thickness of each layer, according to the present invention, since the thickness of each layer is defined by the distance between the lower surface of the flexible transparent film and the upper surface of the platform. Similarly, the thickness of subsequent layers is determined by the distance between the lower surface of the flexible transparent film and top surface of the previously solidified layer. In the case of cantilevered layers, the thickness is determined by the amount of exposure.

Although the Applicants have herein disclosed specific preferred embodiments of the instant invention, the general scope of this invention is limited only by the appended claims and their equivalents.

What is claimed is:

1. In a method for fabricating an integral three-dimensional object by imagewise exposing successive layers of a deformable and photoformable composition to actinic radiation, said method including placing the composition in a vessel containing a platform, the improvement in said method comprising positioning a transparent elastomeric non-adhering film within the composition at a distance equal to the thickness of one layer from the platform, subjecting the elastomeric film to a first tension, exposing imagewise the photoformable composition contained between the film and the platform to radiation through the transparent elastomeric film in order to form a solidified layer, subjecting the elastomeric film to a second tension, the difference between the first and the second tensions being adequately high to overcome the adherence between the film and the solidified layer, increasing the distance between the platform and the film by the thickness of a layer, causing the deformable composition to flow over the solidified layer, and repeating the same steps until the integral three-dimensional object is formed.

2. A method for fabricating an integral three-dimensional object from successive solidified layers of a deformable and photoformable composition comprising the steps of:
   (a) placing the composition in a vessel containing a substantially flat platform;
   (b) positioning within the composition on top of the platform at a distance equal to the thickness of a layer, a transparent, elastomeric and non-adherent film having a first and a second surface, the first surface being opposite and parallel to the second surface, the first surface being disposed in a way to prevent wetting of said first surface by the composition, and at least part of the second surface being disposed in a way to be in contact with the composition;
   (c) subjecting the elastomeric film to a first tension, in a direction substantially parallel to the first and second surfaces of the film;
   (d) exposing imagewise the photoformable composition contained between the film and the platform to radiation through the transparent elastomeric film, in order to form a solidified layer, with the requirement that the radiation is high enough to cause higher adherence between the solidified layer and the platform than between the film and the solidified layer;
   (e) subjecting the elastomeric film to a second tension, in a direction substantially parallel to the first and second surfaces of the film, the absolute value of the difference between the first and the second tensions being adequately high to overcome the adherence between the film and the solidified layer;
   (f) increasing the distance between the platform and the original position of the film by the thickness of a layer;
   (g) causing the deformable composition to flow over the solidified layer;
   (i) subjecting again the elastomeric film to the first tension, in a direction substantially parallel to the first and second surfaces of the film;
   (j) exposing imagewise the photoformable composition contained between the film and the solidified layer to radiation through the transparent elastomeric film, in order to form a new solidified layer, with the requirement that the radiation is high enough to cause higher adherence between the newly solidified layer and the previously solidified layer than between the film and the newly solidified layer;
   (k) subjecting the elastomeric film to the second tension, in a direction substantially parallel to the first and second surfaces of the film, the absolute value of the difference between the first and the second tensions being adequately high to overcome the adherence between the film and the solidified layer;
   (1) repeating steps (f) through (k) until the integral three-dimensional object is formed.

3. A method as defined in claim 1 or 2, further comprising the step of securing on top of and in contact with the film, a substantially flat, substantially rigid and substantially transparent plate.

4. A method as defined in claim 3, wherein the direction of the tension is radial.

5. A method as defined in claim 3, wherein the direction of the tension is linear.

6. A method as defined in claim 5, wherein the direction of the tension is substantially parallel to the direction of scanning.

7. A method as defined in claim 3, wherein the plate and the film are refractive index matched.

8. A method as defined in claim 3, wherein a transparent lubricant is placed between the plate and the film.

9. A method as defined in claim 8, wherein the lubricant is also an optical matching material.

10. A method as defined in claim 3, wherein the film is a fluoroelastomer.

11. A method as defined in claim 1 or 2, wherein the direction of the tension is radial.

12. A method as defined in claim 1 or 2, wherein the direction of the tension is linear.

13. A method as defined in claim 12, wherein the direction of the tension is substantially parallel to the direction of scanning.

14. A method as defined in claim 1 or 2, wherein the radiation is in the form of a laser beam.

15. A method as defined in claim 1 or 2, wherein the film is a fluoroelastomer.

* * * * *